Figure 1A:
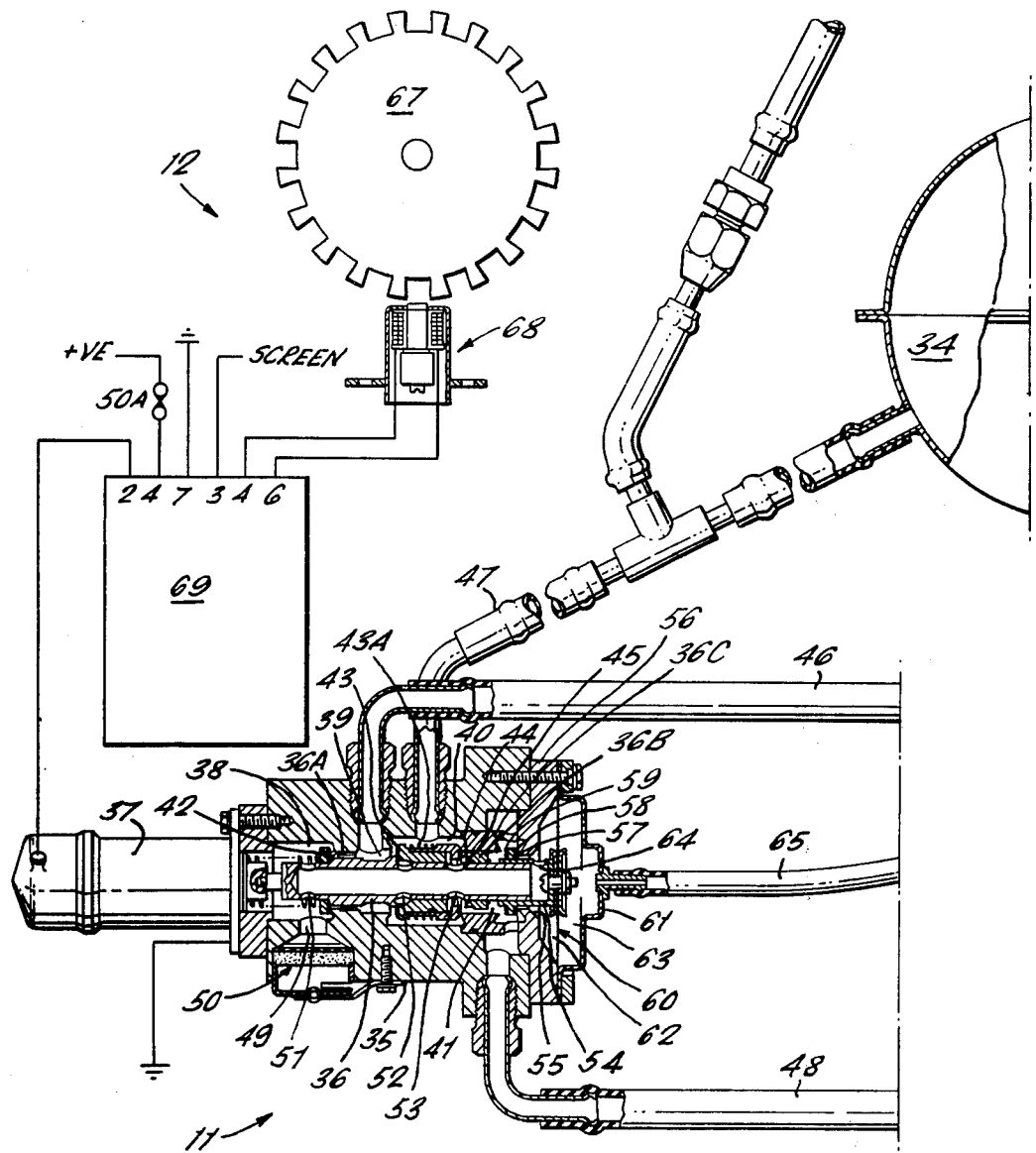

United States Patent [19]

Rolt et al.

[11] 4,033,636
[45] July 5, 1977

[54] VEHICLE ANTI-SKID BRAKING APPARATUS

[75] Inventors: Anthony P. R. Rolt, Stratford-on-Avon; Frederick J. Walker, Banbury, both of England

[73] Assignee: Harry Ferguson Limited, England

[22] Filed: Aug. 7, 1975

[21] Appl. No.: 602,920

[30] Foreign Application Priority Data

Aug. 22, 1974 United Kingdom ............ 36861/74

[52] U.S. Cl. .............................. 303/114; 188/181 A
[51] Int. Cl.² ......................................... B60T 8/08
[58] Field of Search .............. 188/181 A; 303/21 F, 303/114

[56] References Cited

UNITED STATES PATENTS 3,401,986  9/1968  Walker et al. ............ 188/181 A X
3,415,578  12/1968  Walker ..................... 188/181 A X Primary Examiner—Duane A. Reger
Attorney, Agent, or Firm—Mason, Fenwick & Lawrence

[57] ABSTRACT

A vehicle anti-skid braking system is described wherein the brake-applying effort of a driver on a hydraulic master cylinder is assisted or opposed by a reversible servo-booster in accordance with the instant condition of an anti-lock sensor and an associated switch-over valve means. The booster incorporates two shiftable diaphragm actuators only one of which operates to assist braking effort, but both of which operate to oppose braking effort thereby to reduce the possibility of a driver overriding anti-skid operation during "panic" braking. A modified system provides only a single diaphragm actuator for opposing a driver's braking effort under skid conditions.

3 Claims, 2 Drawing Figures

VEHICLE ANTI-SKID BRAKING APPARATUS

This invention relates to anti-skid braking apparatus for vehicles.

In the interests of safety, and to maximise braking efficiency, vehicle braking apparatus has been proposed incorporating means effective to relieve brake action momentarily at the point when a road wheel being braked is about to stop rotating or "lock". In one such proposal, the booster in a servo-assisted braking apparatus is adapted to be reversible in respect of its brake-assisting action, that is to say the booster is operable in reverse to move the brake pedal in opposition to the driver's foot pressure. The selection of assisting or opposing action of the booster is made by a valve which operates in response to a sensor device that senses an imminent wheel lock condition. Usually, when the sensor device is operative, action of the booster is intermittent or pulsing at a frequency of the order of five cycles per second. An advantage of this proposal is that the driver can feel the opposing action of the booster and thus be warned that his foot pressure has produced the optimum braking effect obtainable for the instant road surface condition. However, the proposal has also the disadvantage that the opposing action of the booster may be overridden by a driver for example during panic braking, whereupon wheel-locking and consequent skidding could occur.

The ratio between the size or capacity of a braking booster and the size or weight of the vehicle must preferably be kept within certain limits. It will be understood, therefore, that the mentioned disadvantage is greater for vehicles in the medium to light-weight passenger car range because reversible boosters for vehicles in this range cannot move the brake pedal in opposition to the driver's foot pressure with a force greater than a driver's extreme pedal pressures.

According to the present invention, there is provided an anti-skid braking apparatus for a vehicle, the apparatus comprising a booster operable in one direction to assist a driver's braking effort and in the opposite direction to oppose a driver's braking effort, switching or valve means operable to reverse the direction of operation of the booster, and an anti-skid sensor device for operating the switching or valve means, the booster being adapted so that its instant brake-opposing force is always greater than its maximum brake-assisting force.

Further, according to the present invention, there is provided a vehicle having anti-skid braking apparatus as aforesaid.

Figure 1B:
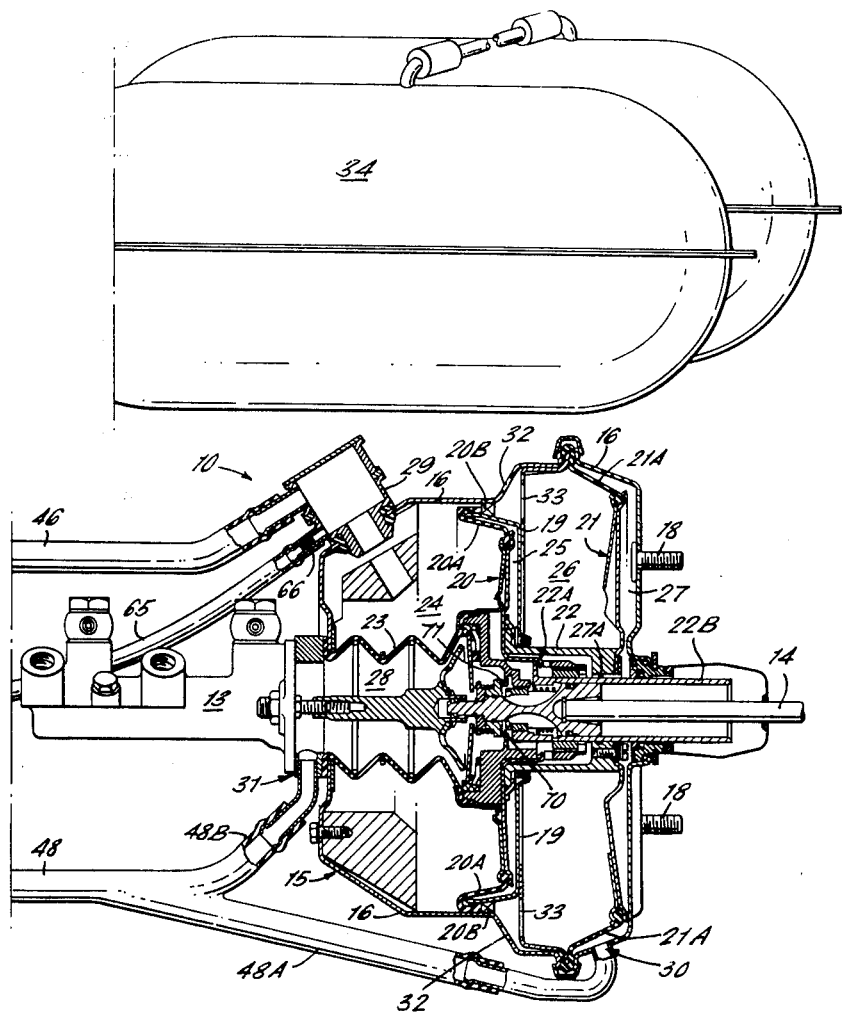

Embodiments of the present invention will now be described, by way of example, with reference to the accompanying drawings, in which:

FIGS. 1A and 1B together constitute a schematic illustration partly in diagrammatic form and partly in sectional elevation of principal components of anti-skid braking apparatus in accordance with one aspect of the present invention.

FIGS. 1A and 1B of the drawings, the anti-skid braking apparatus consists of three principal groups of components, namely a booster and master cylinder assembly 10, a switching or valve means in the form of a changeover control valve assembly 11, and an anti-skid sensor device 12.

In the booster and master cylinder assembly 10, the master cylinder is indicated by reference numeral 13 and operates in known manner to apply a set of vehicle hydraulic brakes (not shown) when a pedal pushrod 14 is moved to the left in FIG. 1B by means of a brake pedal (not shown). The booster is indicated generally by reference numeral 15 and serves normally to augment the pedal force applied to the pushrod 14. More particularly, the booster 15 consists of a hollow metal casing 16 adapted for mounting in a vehicle by means of screwed studs 18. The casing 16 has a fixed partition 19 and houses two actuator elements 20 and 21 respectively. A central aperture in the partition 19 slidably supports a cylindrical portion 22 of a servovalve assembly 22A part of which assembly is arranged inside the portion 22. The left-and right-hand ends of the portion 22 are respectively secured to and are movable with the actuator elements 20 and 21, the latter being in the form of diaphragms of which flexible portions 20A and 21A permit movement of the diaphragms towards and away from the master cylinder 13. The servo-valve assembly 22A operates in known manner, therefore a detailed description of its component parts is not included here. However, the principal valve elements and pathways will be referred to hereinafter. A reinforced convoluted sealing sleeve 23 extends between the left-hand portion of the servo-valve assembly 22A and the master cylinder 13. The partition 19, the diaphragms 20 and 21 and the sleeve 23 divide the interior of the booster 15 into five principal chambers 24, 25, 26, 27 and 28. Provision is made for external communication with chamber 24 through a pipe connector assembly 29, with chamber 27 through a pipe connection 30 and with chamber 28 through a pipe connection 31. The servo-valve assembly 22A provides selective communication between chamber 25 and chambers 24 and 28. Chamber 26 is permanently open to atmospheric pressure through ports 32 and 33 in the casing 16 and the partition 19 respectively. It is to be noted that communication between the chambers 24 and 26 at the periphery of the diaphragm 20 is prevented by means of a sealing ring 20B, and that chamber 27 is isolated from the interior of the servo-valve assembly 22A by means of a sealing ring 27A which slidably engages a tubular component 22B of the servo-valve assembly 22A. The booster 15 is vacuum-operated (as hereinafter described), vacuum being provided by engine induction in association with a vacuum accumulator tank 34. Connections between the booster 15 and vacuum and/or atmospheric pressure are through the change-over control valve assembly 11.

The control valve assembly 11 consists of a valve body 35 wherein a hollow valve spool 36 is slidable by a solenoid 37. The left-hand portion of the spool 36 is supported by a bush 36A, and the right-hand portion of the spool 36 is supported by a peripherally slotted collar 36B which is slidable in a bore of a fixed seating element 36C. The spool 36 extends through chambers 38, 39, 40 and 41 formed in the valve body 35 and carries valve elements 42, 43, 44 and 45 for changing the manner of communication between these chambers depending upon whether the spool 36 is in its right-most position as illustrated in FIG. 1A or in its left-most position (not shown) when pulled by the solenoid 37. Valve chamber 39 communicates with booster chamber 24 by way of a pipe 46; valve chamber 40 communicates with vacuum tank 34 by way of a pipe 47; and valve chamber 41 normally communicates with booster chambers 27 and 28 by way of a pipe 48 having branches 48A and 48B. The valve chamber 38 is permanently open to atmospheric pressure by way of a port 49 and an air filter assembly 50. The valve spool 36 is provided with sets of radial ports 51, 52 and 53. The ports 51 place the chamber 38 in communication with the interior of the spool 36. The right-hand end of the spool 36 is slidably received in a sleeve element 54 which extends with clearance through an opening 55 in an end plate 56 which is secured to the valve body 35. On the inner (left-hand) side of the end plate 56 around the opening 55 is formed a seat 57 which is co-operable with one (58) of two valve elements 58 and 59 carried by the sleeve element 54. The right-hand end of the sleeve element 54 is secured to a flexible diaphragm 60 which together with the end plate 56 and a cover 61 defines chambers 62 and 63. Chamber 62 is in communication with the interior of the valve spool 36 by way of a radial port 64 in the sleeve element 54. The chamber 63 communicates with booster chamber 24 by way of a pipe 65 which incorporates a pneumatic flow restrictor 66 at the connector assembly 29.

The anti-skid sensor device 12 consists of a notched sensor disc 67, an electro-magnet pick-up 68 and an electronic control module 69. The sensor disc 12 is, in use, one of several discs each rotatable with a vehicle road wheel (not shown), or is a single disc rotatable with for example the drive input to an interaxle differential gear (not shown) in a four-wheel-drive transmission wherein the differential action of the interaxle differential gear is limited or controlled. The rotational behaviour of the sensor disc 67 is converted into a stream of electrical signals by the pick-up 68 and these signals are monitored and interpreted by the module 69 which energises the solenoid 37 when a "wheel-lock" or skid condition is imminent.

Operation of the braking apparatus above-described is as follows. In the absence of anti-skid signal from the module 69, the solenoid 37 is not energised and thus allows the spool 36 of the control valve assembly 11 to adopt this right-most position as shown in FIG. 1A. Thus, the vacuum tank 34 communicates with booster chamber 24 by way of pipe 47, valve chamber 40, valve chamber 39 (past valve element 43), pipe 46 and pipe connector assembly 29. Booster chambers 27 and 28 communicate with atmospheric pressure by way of pipe 48, valve chamber 41, radial ports 53 (past the peripheral slots in collar 36B), radial ports 51, valve chamber 38, port 49 and air filter 50. The valve element 42 in the control valve assembly 11 is normally closed and serves simply to prevent air leakage from chamber 38 to chamber 49 past the bush 36A. Until the pushrod 14 is moved leftwards, vacuum in the booster chamber 24 is balanced by vacuum in the booster chamber 25 by virtue of communication between these two chambers through the servo-valve assembly 22A, in particular past an open valve element therein indicated by reference numeral 70. When the pushrod 14 is moved to the left, the valve element 70 is closed and a valve element 71 in servo-valve assembly 22A is opened thus switching the chamber 25 to communication with chamber 28 at atmospheric pressure. Consequently, the diaphragm 20 is urged leftwards to augment the braking effort at the master cylinder 13. When leftward movement of the pushrod 14 is arrested, the valve element 71 closes by virtue of a small overrun movement of the diaphragm 20 to establish a balanced condition. On release of the pushrod 14, the valve elements 70 and 71 revert to their condition as illustrated in FIG. 1B. Throughout the operation so far described, the diaphragm 21 is balanced by atmospheric pressure in chamber 26 and 27 and therefore takes no part in brake assisting action, but merely follows the movement of diaphragm 20. In the event of an imminent skid condition during braking assisted by the booster 15, the spool 36 of the control valve assembly 11 is moved to the left by the solenoid 37 in response to an anti-skid signal from the sensor device 12. Initial leftward movement of the spool 36 allows closure of valve element 43 by a spring 43A, and also closes valve element 45 against valve element 44. Continued leftward movement of the spool 36 opens radial ports 52 to communication with valve chamber 39, and also lifts valve element 44 from the left-hand side of the seating element 36C. Thus, the vacuum tank 34 is placed in communication with pipe 48 by way of pipe 47, chamber 40 and chamber 41 (past valve element 44 and the peripheral slots in the collar 36B). The pipe 48 communicates with booster chamber 25 by way of pipe 48B, pipe connection 31 and booster chamber 28 (past valve element 71). The pipe 48 also communicates with booster chamber 27 by way of pipe 48A and pipe connection 30. Also, booster chamber 24 is placed in communication with atmospheric pressure by way of pipe connector assembly 29 pipe 46, valve chamber 39, radial ports 52 and 51, valve chambers 38, valve port 49 and air filter 50. Consequently, since booster chambers 25 and 27 are connected to vacuum and booster chamber 24 and 26 to atmospheric pressure, both of the diaphragms 20 and 21 are urged rightwards in a direction away from the master cylinder 13 and therefore move the pushrod 14 in opposition to a driver's foot pressure with a force greater than that of the diaphragm 20 acting alone in opposition to braking effort. Immediately braking action is thus relieved, the solenoid 37 is de-energised and the control valve assembly 11 reverts to the illustrated condition thereby to re-establish assisted braking. The control valve assembly 11 may cycle at a frequency of the order of five cycles per second so long as a skid condition is imminent.

The diaphragm 60 and the components immediately associated therewith in the control valve assembly 11 together constitute a fail-safe device the purpose of which is to cancel the brake-opposing action of the booster 15 in the event of a fault such as would cause such brake-opposing action to persist, for example sticking of the valve spool 36 in its left-most position. Operation of the fail-safe device is as follows. Normally, the valve chamber 63 is subjected to vacuum by virtue of its communication with booster chamber 24 through pipe 65, restrictor 66 and pipe connector assembly 29. Also, the valve chamber 62 is at atmospheric pressure by communication with valve chamber 38 through radial port 64, the interior of the spool 36 and radial ports 51. Thus, the diaphragm 60 is urged rightwards thereby to hold valve element 58 against seat 57 and to hold valve element 59 off to right-hand side of the seating element 36C leaving an open path between the peripheral slots of collar 36B and the pipe 48. During brake-opposing action of the booster 15, the booster chamber 24 is opened to atmospheric pressure as previously described herein. If this latter condition persists, the vacuum in valve chamber 63 is released through 65 and restrictor 66 at a rate determined by the size of the restrictor. Due to the presence of atmospheric pressure in valve chamber 62 and the presence of vacuum in valve chamber 41, a point is reached whereat the valve element 58 is lifted away from seat 57. Thereupon, a temporary admission of vacuum past valve elements 59 and 57 through the clearance around the sleeve 54 into the chamber 62 causes the diaphragm 60 rapidly to move further leftwards so to close valve element 59 against the right-hand side of seating element 36C thereby isolating pipe 48 from further vacuum. Simultaneously, communication of pipe 48 to atmospheric pressure is established past valve element 58, the clearance around sleeve 54, radial port 60, the interior of valve spool 36 and radial ports 51. Thus, the possibility of non-assisted braking is established since both sides of diaphragms 20 and 21 are now in communication with atmospheric pressure.

In FIG. 1B, it can be seen that the diaphragm 21 has a greater surface area than the diaphragm 20. Accordingly, the brake-opposing force developed will be greater than twice the maximum attainable brake-assisting force. Thus, where the booster is designed to provide a relatively small maximum assisting force for example consistent with requirements for a medium or lightweight vehicle; the possibility of a driver overriding the anti-skid action of the booster is reduced or eliminated. Moreover, it will be apparent from consideration of the foregoing description that modifications thereof within the scope of the present invention include the possibility of dispensing with the reverse action of the smaller diaphragm or actuator where the latter is the assisting actuator. Also, provided that the reverse action of the brake-assisting diaphragm or actuator is retained, the second diaphragm or actuator which acts only to oppose braking action may have a surface area equal or or even less than that of the reverse-acting diaphragm or actuator depending on what amount of additional force is required during brake-opposing action to minimise or eliminate the possibility of a drive "pushing through".

We claim:

1. An anti-skid braking apparatus for a vehicle, the apparatus comprising a booster including a first actuator element operable in one direction to provide a brake-assisting force to assist a driver's braking effort and a second actuator element operable in an opposite direction to provide a brake-opposing force to oppose a driver's braking effort, switching means for actuating the second actuator element, an anti-skid sensor device for actuating the switching means and wherein the second actuator element includes means for causing the maximum brake-opposing force to always be greater than the maximum brake-assisting force.

2. An anti-skid braking apparatus according to claim 1 additionally including means for actuating the first actuator element to provide a further force opposing a driver's braking effort.

3. An anti-skid braking apparatus according to claim 2, wherein the booster is vacuum operated and said actuator elements are shiftable diaphragms.

* * * * *